United States Patent [19]
Marnett

[11] 3,791,348
[45] Feb. 12, 1974

[54] AUTOMATED DOG KENNEL
[76] Inventor: Paul J. Marnett, 457 N. 17th St., Kansas City, Mo. 64108
[22] Filed: Nov. 24, 1972
[21] Appl. No.: 309,230

[52] U.S. Cl. ................................................ 119/19
[51] Int. Cl. ........................................... A01k 01/00
[58] Field of Search ............. 119/19, 16, 22, 29, 28

[56] References Cited
UNITED STATES PATENTS

| | | | |
|---|---|---|---|
| 3,718,120 | 2/1973 | Schwarz et al. | 119/16 |
| 2,969,768 | 1/1961 | Grant | 119/29 |
| 3,119,374 | 1/1964 | Ladner | 119/29 |
| 3,274,973 | 9/1966 | Woods et al. | 119/28 X |

Primary Examiner—Hugh R. Chamblee
Attorney, Agent, or Firm—Lowe, Kokjer, Kircher, Wharton & Bowman

[57] ABSTRACT

An automated dog kennel utilizes a rotatable belt for the floor of an enclosed structure. The belt is movable to exercise the animal and also to carry waste material into a drain beneath the belt. A plurality of nozzles coupled with a water source are positioned at the forward end of the belt as the latter rotates in one direction toward this end. The nozzles are placed to spray water in the direction of an animal on the belt to discourage the animal from approaching the end and thus prevent the animal from getting a leg caught between the moving belt and supporting framework. These nozzles may also serve to pre-soak the belt to facilitate removal of waste material. A second set of nozzles is positioned adjacent the belt to spray the belt with additional cleaning liquid subsequent to the spray of the first set of nozzles as the belt rotates. An enclosed housing for protecting the animal from the elements is disposed adjacent the belt and in communication with the enclosed structure. The housing includes a bottom, sidewalls, and a movable roof which is positioned at a height sufficient to accommodate the animal beneath it when the animal is in a lying position while preventing the animal from assuming a standing position. This forces the animal to leave the housing and stand on the rotatable belt for defecation or urination.

6 Claims, 9 Drawing Figures

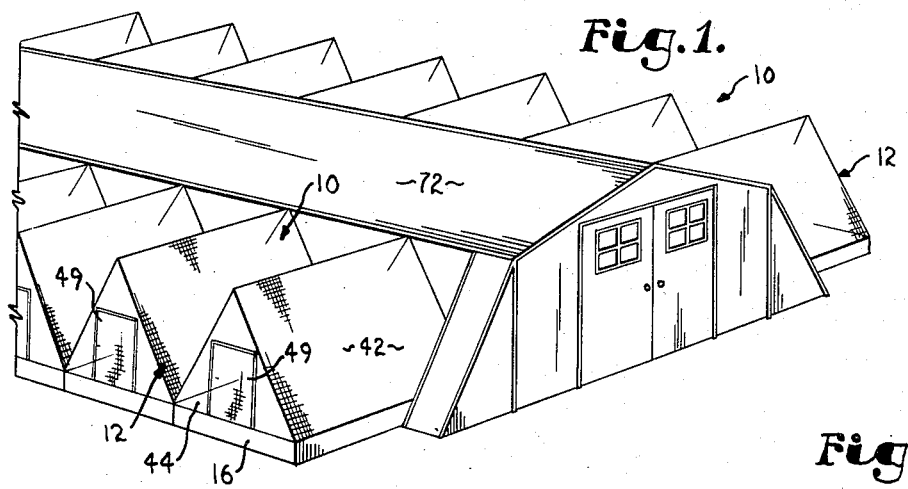
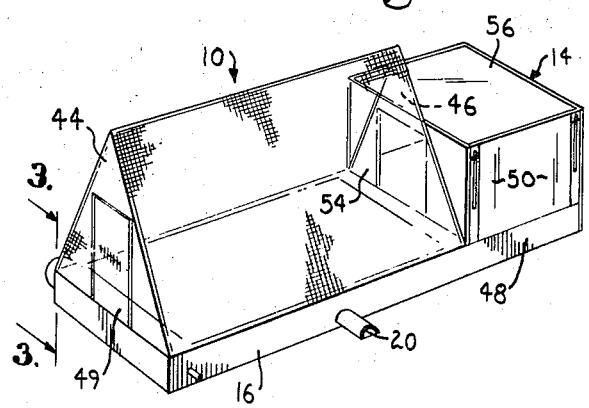
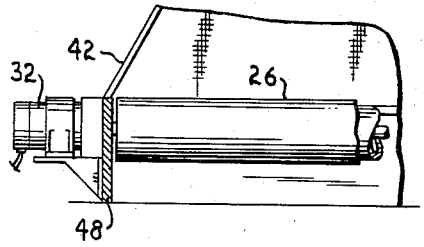
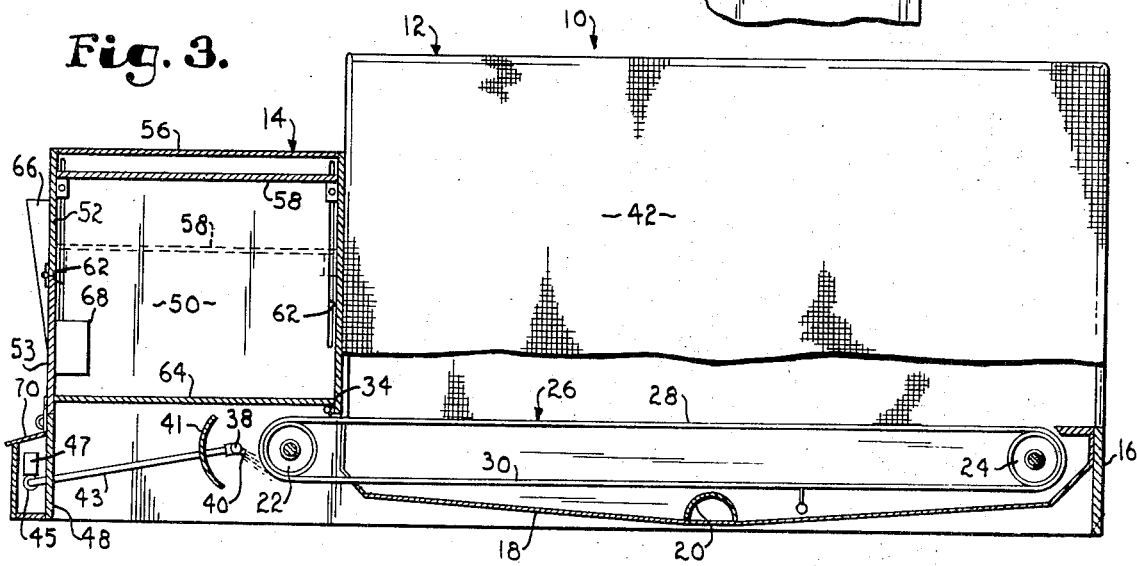

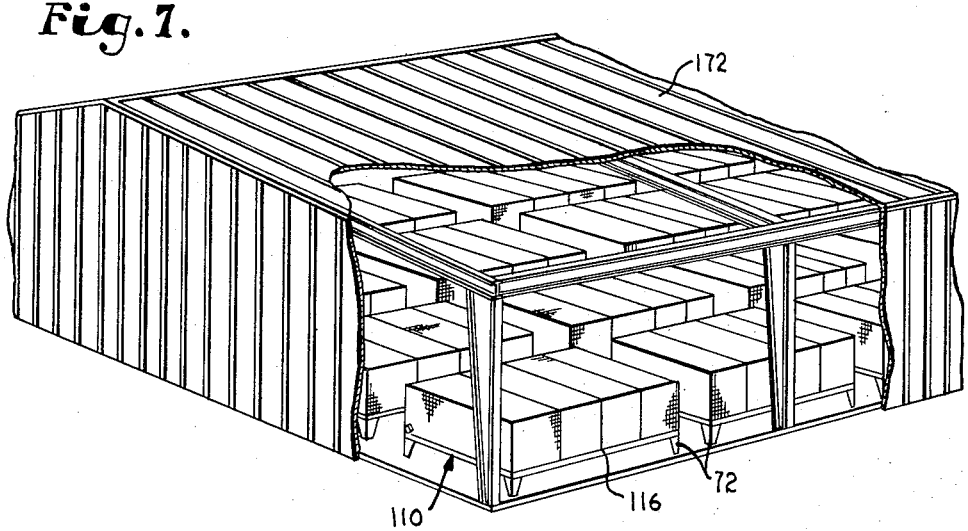
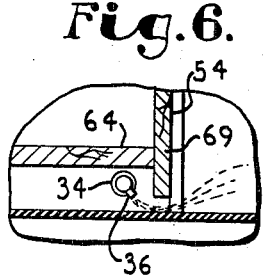
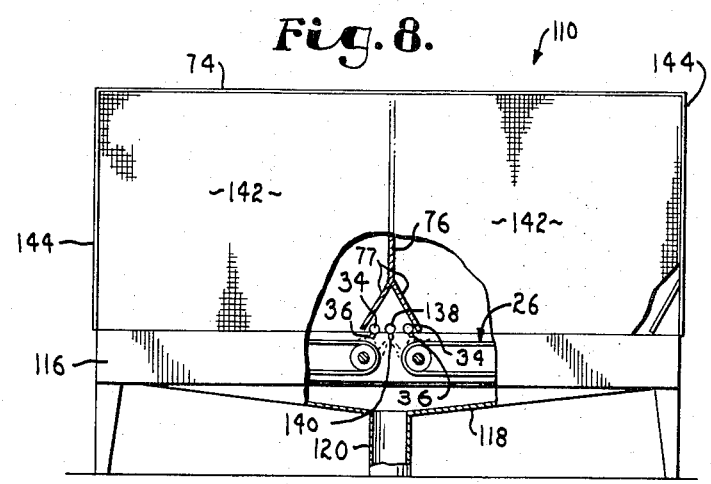
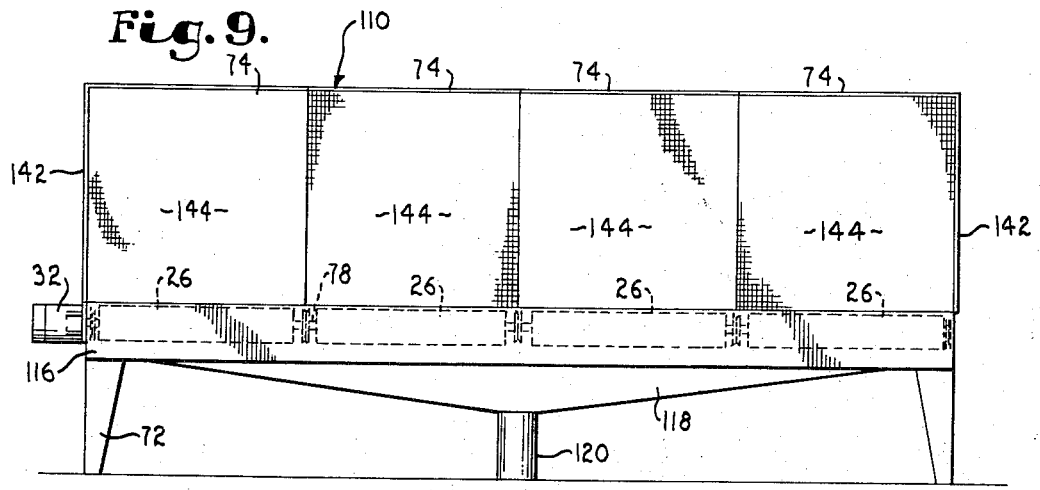

AUTOMATED DOG KENNEL

This invention relates to the housing and care of animals, and more particularly, to an enclosure for keeping an animal in confinement which automatically exercises the animal and also provides for automatic cleaning of the enclosure.

It has become very expensive to keep a large number of dogs in a commercial kennel or even a municipal dog pound. It has always been a problem when confining a dog for a long period of time to periodically provide the dog with needed exercise. A small "run" is frequently provided adjacent a dog house, but it offers only limited maneuverability and exercise. In municipal dog pounds where space is at a very high premium, even this limited amount of space for exercising is frequently absent.

Another one of the substantial problems of confining a dog is the need to periodically clean waste material from the area of confinement. This is an unpleasant job which has heretofore required manual labor and is responsible for a substantial percentage of the total cost of keeping the animal.

While there have been other attempts to provide dog kennels with moving floors for the purpose of exercising the dog and also removing waste materials, these have been largely unsatisfactory. It has been found that animals object to living in such quarters where there is no way for them to "escape" from the movable floor. In some cases this has resulted in there being provided a secondary dog house adjacent the movable floor where the dog may periodically go for sleeping. The fact that some of the dog's living area is removed from the movable floor requires some manual cleaning, however, thus largely defeating the advantages of the movable floor.

Still another problem with kennels having movable floors constructed according to prior teachings has been the danger of an animal's leg slipping into the area between the leading edge of the movable floor and the supporting structure. Because of this danger, close supervision requiring manual labor, has been required when the floor is in motion or various protective guards have been provided which interfere with movement of waste material from the floor.

It is, therefore, an object of the present invention to provide an enclosure for keeping an animal which includes a movable floor for exercising the animal and automatically removing waste from the area and also has a safety nozzle for spraying a liquid onto the animal from the end of the floor, thereby conditioning the animal to stay away from the end and assuring that the animal will not get a leg caught in the moving floor. This conditioning is a result of both the sound of the water against a moving belt and actual contact between the dog and the water.

It is another objective of this invention to provide an enclosure for keeping an animal which automatically exercises the animal and removes waste material from the enclosure wherein a number of such enclosures may be disposed in side-by-side relationship and placed in communication with a common drain.

An important aim of this invention is to provide an enclosure for an animal as described in the object second above wherein the safety nozzle is also disposed to pre-soak the moving floor to facilitate in the removal of waste material therefrom, and a second nozzle is disposed to spray a cleaning liquid onto the floor subsequent to the spray of the first nozzle to complete cleaning of the floor.

Another object of the present invention is to provide an enclosure for keeping an animal which automatically exercises the animal and removes waste material and includes a stationary housing to protect the animal from the elements and offer an area for respite from the movable floor wherein the housing includes a roof positioned to accommodate the animal therebeneath in a lying position, while prohibiting the animal from standing to thereby force the animal onto the movable floor for defecation or urination.

As a corollary to the above object, an aim of the invention is to provide a housing as described wherein the roof is movable to different heights thereby accommodating animals of different sizes.

Other objects of the invention will be made clear or become apparent from the following description and claims when read in light of the accompanying drawings wherein:

FIG. 1 is a perspective view of a plurality of dog kennels constructed according to the present invention and disposed in side-by-side relationship in parallel rows on either side of a common, central enclosure;

FIG. 2 is a perspective view of one of the kennel enclosures illustrating the enclosed run area which is open to the atmosphere and the enclosed housing which protects an animal from the elements;

FIG. 3 is an enlarged side elevational view of the enclosure shown in FIG. 2 with portions being presented in cross section to illustrate details of the component parts;

FIG. 4 is a fragmentary front elevational view showing the forward drive roller for the movable belt floor;

FIG. 5 is an enlarged fragmentary view of the movable roof support;

FIG. 6 is an enlarged fragmentary side elevational view of the safety nozzle;

FIG. 7 is a perspective view of an alternative form of the invention illustrating a number of enclosures placed in side-by-side relationship in a common building;

FIG. 8 is an enlarged side elevational view of one of the units comprising the alternative form of the invention with portions broken away to show details of construction; and FIG. 9 is a front elevational view of four of the units of FIG. 8 placed in side-by-side relationship for communication with a common drain.

Referring initially to FIGS. 1-5, the novel enclosure for keeping an animal such as a dog is designated generally by the numeral 10. Enclosure 10 comprises a structure 12 of a generally inverted V configuration which presents a run area, open to the atmosphere, and a housing 14 for protecting a dog from the elements. Structure 12 comprises a base frame 16 disposed on top of a slanted floor 18 which communicates at the point of lowest elevation with a drain 20. First and second rollers 22 and 24 are disposed at opposite ends of frame 16 for the purpose of mounting a movable belt 26. Belt 26 has a first stretch 28 which is substantially co-extensive in both length and width with structure 12 to present a floor for the latter. A second stretch 30 of the belt 26 is disposed in spaced, parallel relationship to first stretch 28 and carries waste material toward drain 20. Belt 26 is rotated by a prime mover such as an electric motor 32 that rotates the forward roller 22.

The belt 26 is normally rotated in a counterclockwise direction when viewing FIG. 3 toward the forward end of the belt as it rotates in this direction. Positioned immediately above belt 26 at the forward end is a header line 34 (FIG. 6) mounting a plurality of nozzles 36 transversely across the width of the belt. Line 34 is adapted to be coupled with a liquid cleaning agent such as water and is carefully positioned to spray some of the liquid onto upper stretch 28 while some of the liquid is directed downwardly onto the bight of belt 26 which joins the upper stretch with lower stretch 30. An additional header line 38 mounts a plurality of nozzles 40 positioned adjacent the forward end 30 of the belt with the nozzles directed to spray a second liquid cleaning agent onto the belt. A shield 41 also extends traversely across the width of belt 26 to confine the liquid spray to the area of the belt. Water is supplied to line 38 through a delivery conduit 43 and a similar conduit (not shown) supplies line 34. Conduit 43 has a pressure regulator 45 and a time controlled valve indicated generally by the numeral 47.

Extending upwardly from frame 16 are two converging mesh sidewalls 42 which cooperate with end walls 44 and 46 to define the enclosed run area for confining a dog. Walls 42-46 are constructed from heavy wire or the like to provide for free movement of air through the area. A door 49 in end wall 44 provides access to the interior of structure 12.

A forwardly extending section 48 of frame 16 presents a base for housing 14. Housing 14 comprises spaced-apart, solid end walls 50, a rear wall 52 having a hinged door 53 and a forward wall 54 having a door opening therein. The opening of wall 54 communicates with a similar opening in the wall 46 of structure 12. A first generally planar roof component 56 is disposed on top of walls 50-54 in rigid relationship with the latter for structural purposes. A second "false" roof component 58 is disposed between the sidewalls of housing 14 immediately beneath component 56. The second roof component 58 is movable into various horizontal positions as indicated in FIG. 3 by virtue of wing nut fastening assemblies 60 and slots 62 in end walls 50. A rigid bottom 64 for housing 14 is disposed with its leading edge extending over the upper stretch 28 of belt 26. Bottom 64 is rigid with sidewalls 50-54. A feed container 66 is secured to wall 52 of housing 14 as is a water container 68. A box frame 70 immediately beneath and to the front of bottom 64 encloses the aforedescribed time control valve and timing mechanisms. It is to be noted that bottom 64 overlies enough of belt 26 to shield the end of the belt and reduce the chance of a dog getting a leg caught in the rotating belt. To this end, wall 54 extends down over the edge of bottom 64 to present a protective guard lip 69.

As best illustrated in FIG. 1, enclosure 10 may be conveniently disposed in side-by-side relationship with a plurality of identical enclosures on either side of a building 72 defining a central passageway between the two rows of enclosures. Each housing 14 is placed within the confines of building 72 to facilitate heating of the housings when necessitated by weather conditions.

Roof component 58 is positioned to accommodate the dog therebeneath when it is in a lying position, while not permitting the dog to stand up. This forces the dog to enter structure 12 and stand on belt 26 when defecating or urinating. Motor 32 is periodically activated to rotate the belt and cause waste material to move from upper stretch 28 around to drain 20. Whenever the belt is rotating a liquid cleaning agent will be emitted through nozzles 36 and 40 to clean the belt. As previously mentioned, it is important to position nozzles 36 so that a portion of the liquid spray will be directed toward an animal standing on upper stretch 28. The line of impingement of the liquid onto belt 26 and upwardly in the direction of a standing dog is indicated in FIG. 6. This will keep the animal from moving to the forward end of the belt where it could possibly get a leg caught between lip 69 and belt 26. Header line 34 may be connected with a source of detergent or soap in addition to water, to pre-soak the belt and commence removal of any dirt which has become hardened on the belt. As the upper stretch 28 continues to rotate around rollers 22 and 24, it will move into the position of lower stretch 30 where nozzles 40 will continue to spray the belt and remove dirt along with the cleaning detergent. It may also be desirable to incorporate a disinfectant into the stream of liquid passing through header line 38. Rotation of belt 26 is also utilized to periodically exercise the dog. To this end, it may be desirable to incorporate a high frequency sound source in housing 14 to induce an animal to leave the housing when desired. A sound source above normal audible human frequencies but within the range of a dog will normally be uncomfortable to the dog and induce it to leave the housing.

Manifestly, enclosure 10 incorporates the advantages of a kennel run which is open to the atmosphere while still providing a protected area where the animal can go to be out of the elements. Because of the presence of housing 14 where a dog knows that it may escape moving belt 26, it is found that the psychological impact on the dog from being subjected to the moving belt is minimized.

An alternative form of the invention is illustrated in FIGS. 6-8 and designated generally by the numeral 110. A plurality of enclosures 110 are disposed in side-by-side relationship within a large building 172 such as might be found at a municipal dog pound. Each unit 110 comprises a base frame 116 disposed upon legs 72. End walls 144 together with side walls 142 and roof 74 present an enclosed kennel run area which is divided into two identical sections by a vertical partition 76. First and second rotatable belts 26 present the floors for each of the sections. Each group of four floor belts 26 is driven by a common shaft 78 passing through each of the rollers and in turn rotated by a motor 32. A generally inclined floor section 118 spans the length and width of each group of floor enclosures 110 to communicate eight kennel sections presented by four units 110 with a common drain 120.

Thus, while the unit 110 does not include housing 14 described above, it operates in a similar manner to exercise a dog and clean belt 26. A first set of nozzles 36 positioned at the forward end of each belt, as the latter rotates, is positioned behind a shield 77 to spray a certain amount of water onto the upper stretch of the belt where an animal is standing. This assures that the animal will not catch a leg under the protective shield during rotation of the belt. A centrally disposed second header line 138 has a plurality of nozzles 140 to complete washing of belt 26 and direct waste material into drain 120.

The enclosure 110 will normally be used where space is at a premium because of the large number of animals being housed, and the animal will normally not be confined except for a relatively short period of time. While the invention has been disclosed with reference to both embodiments being placed in side-by-side relationship with a number of units of similar construction, it is to be emphasized that in many instances a single unit will be employed. For example, a home owner or hunter will find the invention very practical for keeping individual dogs.

Having thus described the invention, what is claimed as new and desired to be secured by Letters Patent is:

1. An enclosure for keeping an animal comprising:
   structure defining an enclosed exercise and waste discharge area for confining the animal;
   a rotatable belt disposed within said area and having a first stretch presenting a floor for said structure and a second stretch disposed in parallel spaced relationship to the first stretch;
   means for rotating said belt;
   a safety nozzle disposed at the forward end of the belt as the latter rotates in one direction toward said end,
   said nozzle adapted to be coupled with a source of water and positioned to spray water in the direction of an animal on the first stretch whereby when the belt is rotated the animal is discouraged from approaching said one end; and
   a housing adjacent to and communicating with said structure, said housing providing protection for the animal from the elements,
   said housing including a movable roof adapted to be located at a height sufficient to accommodate the animal thereunder in a lying position while preventing the animal from assuming a standing position;
   whereby the animal must move from within said housing to said structure in order to assume a standing position and discharge waste material.

2. The invention of claim 1, wherein is provided a cleaning nozzle disposed to spray a liquid cleaning agent onto the belt subsequent to the spray of said safety nozzle as the belt rotates in said one direction whereby to remove waste material from the belt.

3. The invention of claim 2, wherein said safety nozzle is positioned to spray said belt to pre-soak said waste material and thereby facilitate removal of the latter by said cleaning nozzle.

4. The invention of claim 3, wherein said safety nozzle and said cleaning nozzle each comprises a heading line extending transversely of the belt substantially across the width thereof with a plurality of openings in said line spaced along the length thereof.

5. The invention of claim 2, wherein is included a floor disposed beneath said belt and slanted in at least one direction; and a drain in the floor at the points of lowest elevation to remove said waste material.

6. The invention of claim 5, wherein a plurality of enclosures are disposed in side-by-side relationship, said floor extending beneath the belts of each of said enclosures.

* * * * *